March 24, 1925. 1,531,180
E. G. ERICKSON
UNDERSLUNG BOAT CART
Filed June 5, 1924 2 Sheets-Sheet 1
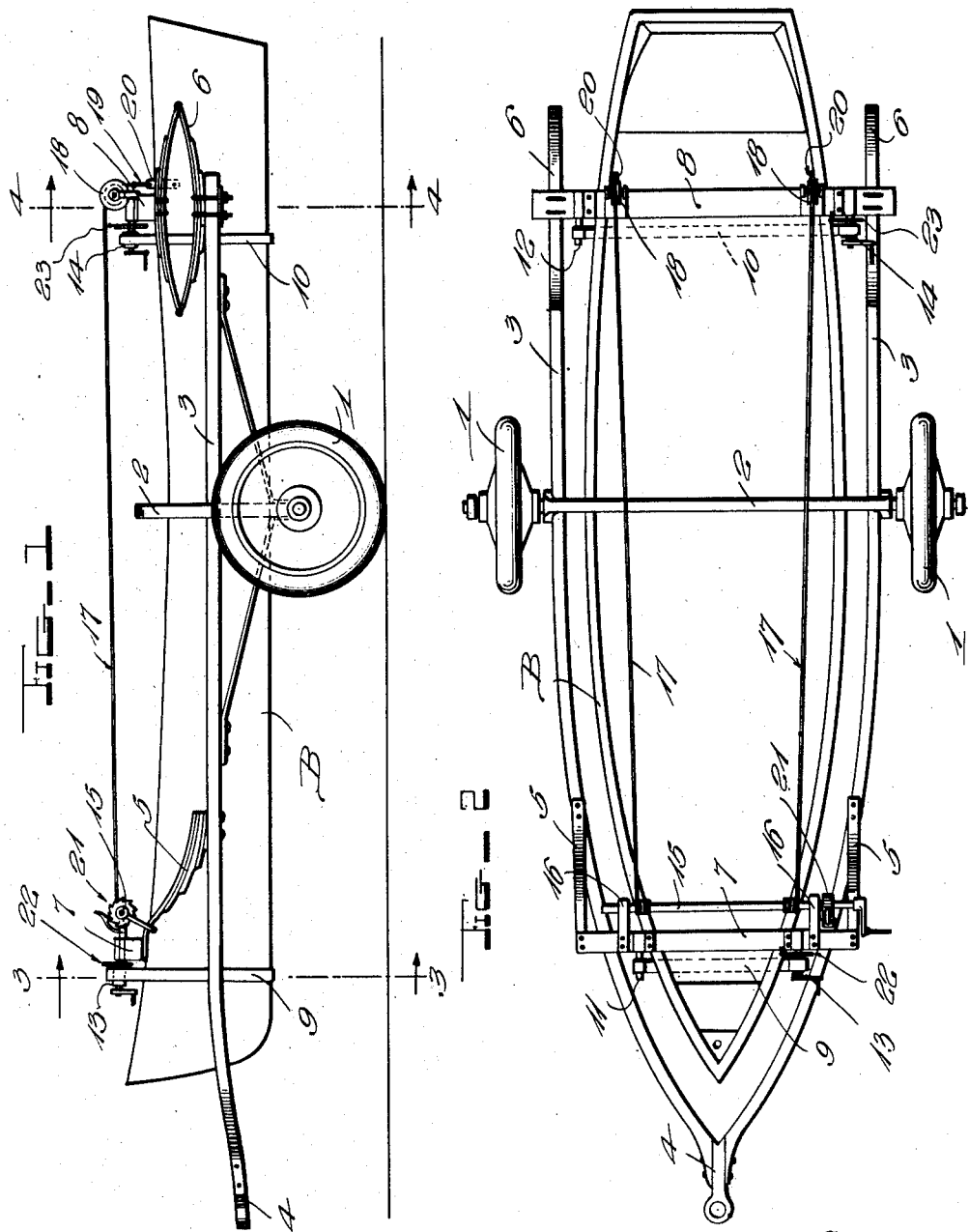
Witness
Inventor
E. G. Erickson
By H. B. Willson & Co.
Attorneys March 24, 1925.  1,531,180
E. G. ERICKSON
UNDERSLUNG BOAT CART
Filed June 5, 1924  2 Sheets-Sheet 2
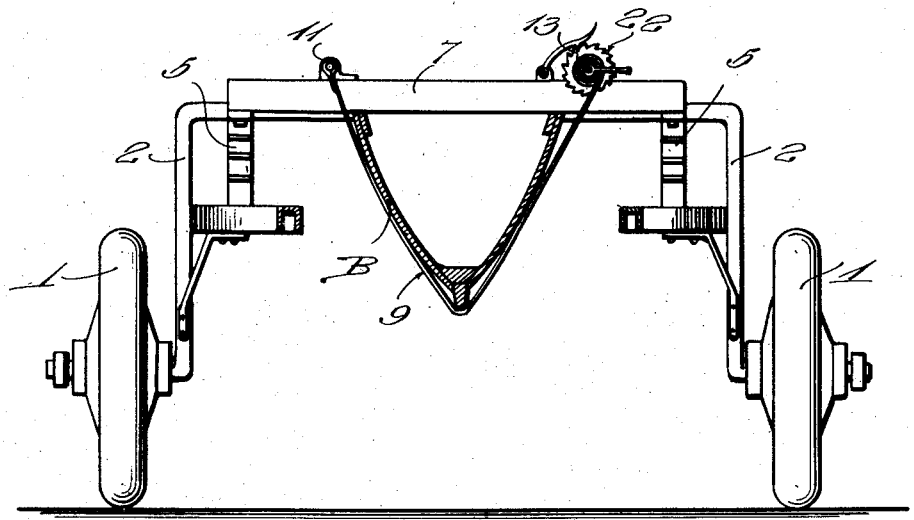
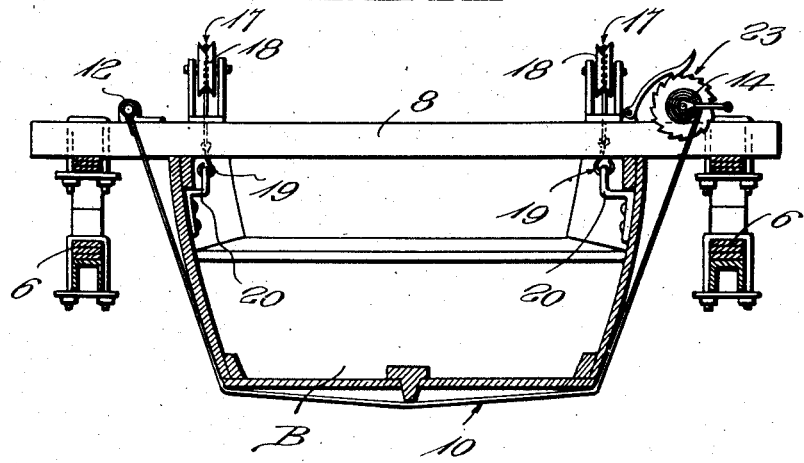
Witness  Inventor
E. G. Erickson
By H. B. Willson &co.
Attorneys Patented Mar. 24, 1925.

1,531,180

UNITED STATES PATENT OFFICE.

ERICK G. ERICKSON, OF ALEXANDRIA, MINNESOTA.

UNDERSLUNG BOAT CART.

Application filed June 5, 1924. Serial No. 718,082.

*To all whom it may concern:*

Be it known that I, ERICK G. ERICKSON, a citizen of the United States, residing at Alexandria, in the county of Douglas and State of Minnesota, have invented certain new and useful Improvements in Underslung Boat Carts; and I do declare the following to be a full, clear, and exact description of the invention, such as will enable others skilled in the art to which it appertains to make and use the same.

My invention relates to improvements in wheeled devices for carrying rowboats, canoes and the like, over land, and the present disclosure is directed to a device of this class which is designed primarily to trail behind a motor vehicle.

The principal object of the invention is to provide a novel type of boat cart in which the boat is yieldably supported by springs upon the frame of the cart, and in which novel means are provided for raising or lowering the boat, as occasion may demand With the foregoing and minor objects in view, the invention resides in the novel subject matter hereinafter described and claimed, the description being supplemented by the accompanying drawings.

Figure 1 is a side elevation of a cart constructed in accordance with my invention, showing a boat supported thereby.

Figure 2 is a plan view of the parts shown in Fig. 1.

Figures 3 and 4 are transverse sectional views on lines 3—3 and 4—4 of Fig. 1.

In the drawings above briefly described, I illustrate a frame mounted upon appropriate wheels 1 which are preferably provided with pneumatic tires. This frame preferably includes an arched transverse axle 2 and a pair of longitudinal side bars 3 which are secured between their ends to the vertical portions of said axle, the front ends of said side bars being preferably brought together and connected to a suitable hitch 4. Front and rear springs 5 and 6 are secured to the side bars 3 and extend upwardly therefrom, the front springs 5 being intended to support the front end of a rowboat or the like B, while the rear springs 6 support the greater part of the weight of the boat. Hence, the springs 6 are preferably rather strong and of elliptic form as shown, while the springs 5 may be relatively weak and in the form of cantilevers. Front and rear transverse bars 7 and 8 have their ends secured to the springs 5 and 6 respectively, and front and rear sling-straps 9 and 10 depend from said bars. At one end, the sling-straps 9 and 10 are secured as indicated at 11 and 12 respectively, while the other ends thereof are connected with drums 13 and 14 which are mounted on the bars 7 and 8 and provided with suitable ratchets or the like for normally holding them against movement. These sling-straps are adapted to extend under the boat as clearly shown in the several views.

A transverse drum or shaft 15 is carried by the front transverse bar 7 through the instrumentality of suitable bearings 16, and a pair of cables 17 are secured at the front ends to said drum, the rear portions of these cables being trained over cable-guides 18 which are carried by the bar 8. The rear extremities of the cables 17 are provided with hooks or the like 19 which may be engaged with suitable cleats 20 within the boat B, as most clearly illustrated in Fig. 4. A ratchet mechanism 21 is provided to hold the drum or shaft 15 in any position to which it may be turned, and the ratchet mechanisms for the drums 13 and 14, are designated at 22 and 23, respectively.

Whenever a boat is to be raised and carried by the improved cart, whether said boat is on dry land or partially in the water, the cart is positioned over the boat and the sling 9 is loosened, passed under the front end of the boat and is then tightened sufficiently to partly raise said front end. Then, the cables 18 are connected with the stern of the boat by means of the hooks or the like 19, and the drum 15 is operated so that said cables will elevate the boat until it comes in contact with the rear bar 8. Then, the rear sling 10 is placed under the boat and tightened, after which the cables 17 may be slackened and released from the boat if desired. If the front sling 9 was not tightened to bring the front end of the boat against the bar 7, previous to elevating the rear end of the boat, said front sling is then tightened and it will co-operate with the rear sling 10 in effectively supporting the boat from the bars 7 and 8, which are in turn supported upon the springs 5 and 6. Thus, even though the cart be pulled rather rapidly over rough highways, there is practically no danger of injuring the boat, even though quite a load of camping equipment or the like be carried in said boat.

Excellent results may be obtained from the general construction shown and described and it is therefore preferably followed, but within the scope of the invention as claimed, numerous modifications may be made.

I claim:—

1. A boat cart comprising a wheeled frame, transversely alined springs carried by the front and rear of said frame, front and rear transverse bars whose ends are supported by said springs, front and rear adjustable slings pendant from said bars, a transverse drum supported by the front springs, cable guides supported by the rear springs, and pulling and elevating cables secured at their front ends to said drum and trained over said guides and having their rear ends depending.

2. A boat cart comprising a frame structure having an arched wheeled axle and longitudinal side bars secured to said axle, front and rear sets of transversely alined springs secured to and rising from the front and rear portions of said side bars, front and rear transverse bars whose ends are secured to said springs, front and rear adjustable boat-carrying slings pendant from said front and rear bars, a transverse drum mounted on the front bar, a pair of cable guides mounted on the rear bar, and a pair of boat-elevating cables trained over said cable guides, the front ends of said cables being connected to said drum, the rear ends of said cables being adapted for connection with the boat to be elevated and carried.

In testimony whereof I have hereunto affixed my signature.

ERICK G. ERICKSON.